(12) United States Patent
Jalali

(10) Patent No.: US 7,379,750 B2
(45) Date of Patent: May 27, 2008

(54) COMMUNICATIONS HANDOFF USING AN ADAPTIVE ANTENNA

(75) Inventor: Ahmad Jalali, Rancho Sante Fe, CA (US)

(73) Assignee: Qualcomm Incorporated, San Diego, CA (US)

(*) Notice: Subject to any disclaimer, the term of this patent is extended or adjusted under 35 U.S.C. 154(b) by 165 days.

(21) Appl. No.: 11/182,295

(22) Filed: Jul. 15, 2005

(65) Prior Publication Data

US 2006/0223573 A1 Oct. 5, 2006

Related U.S. Application Data

(60) Provisional application No. 60/666,417, filed on Mar. 29, 2005.

(51) Int. Cl.
H04M 1/00 (2006.01)
H04Q 7/20 (2006.01)

(52) U.S. Cl. .............. 455/550.1; 455/437; 455/442

(58) Field of Classification Search ............. 455/436, 455/437, 440, 442, 443, 550.1
See application file for complete search history.

(56) References Cited

U.S. PATENT DOCUMENTS

| | | | |
|---|---|---|---|
| 5,303,240 A | | 4/1994 | Borras et al. |
| 5,844,522 A | * | 12/1998 | Sheffer et al. ............... 342/457 |
| 6,768,913 B1 | * | 7/2004 | Molnar et al. ............ 455/562.1 |
| 6,963,745 B2 | * | 11/2005 | Singh et al. ................. 455/437 |
| 7,058,401 B1 | * | 6/2006 | Sinivaara et al. ........... 455/431 |
| 2002/0137538 A1 | * | 9/2002 | Chen et al. .................. 455/550 |
| 2005/0276247 A1 | * | 12/2005 | Heiman et al. .............. 370/331 |

FOREIGN PATENT DOCUMENTS

| | | | |
|---|---|---|---|
| EP | 0932319 | * | 7/1999 |
| EP | 0932319 A | | 7/1999 |
| EP | 1069706 A1 | | 1/2001 |
| GB | 2393077 A | | 3/2004 |
| WO | 96008850 A | | 3/1996 |

* cited by examiner

Primary Examiner—Duc M. Nguyen
Assistant Examiner—Michael Thier
(74) Attorney, Agent, or Firm—Amin, Turocy & Calvin, LLP (57) ABSTRACT

One implementation provides a novel station-to-station handoff using an adaptive or directional antenna. The directional antenna generates a plurality of directional search beams to search for pilot signals from new base stations. The search beams are scanned one beam at a time to obtain the relative direction of all new base stations detected. From the detected base stations, a new base station with the strongest signal strength is selected and compared to the currently used base station. If the new base station has stronger signal strength than the current base station, then a communication handoff from the current base station to the new base station is initiated. In one feature of the present invention, two directional beams are used to communicate with the current and new base stations. Once a communication link is established with the new base station, the directional beam to the current base station is terminated.

20 Claims, 7 Drawing Sheets

COMMUNICATIONS HANDOFF USING AN ADAPTIVE ANTENNA

CLAIM OF PRIORITY UNDER 35 U.S.C. §119

The present Application for Patent claims priority to Provisional Application No. 60/666,417 entitled "Handoff Between Base Stations Using A Directional Antenna", filed Mar. 29, 2005 and assigned to the assignee hereof and hereby expressly incorporated by reference herein.

REFERENCE TO CO-PENDING APPLICATIONS FOR PATENT

The present Application for Patent is related to the following co-pending U.S. patent application Ser. No. 11/182,236, entitled "Antenna Array Pattern Distortion Mitigation", filed concurrently herewith, assigned to the assignee hereof, and expressly incorporated by reference herein.

BACKGROUND

1. Field

Various embodiments of the invention pertain to wireless communication systems. At least one embodiment of the invention pertains to a system and method of transferring communications from a first base station to a second base station from a mobile communication device using a directional antenna.

2. Background

Wireless communication networks enable communication devices to transmit and/or receive information while on the move. These wireless communication networks may be communicatively coupled to other public or private networks to enable the transfer of information to and from the mobile communication devices. Such communication networks typically include a plurality of base stations which provide wireless communication links to mobile communication devices. The base stations may be stationary (e.g., fixed to the ground) or mobile (e.g., mounted on satellites, etc.) and positioned to provide wide area coverage as the mobile communication device travels across different coverage areas.

As a mobile communication device moves around, its communication link with a base station may degrade. In this situation, the communication device switches or connects with another base station for a better quality communication link while its first link is still active. This process of establishing a communication link with another base station is referred to as a "handoff". The handoff process typically faces the problem of maintaining a reliable communication link with the wireless communication network while switching base stations. Soft handoffs and hard handoffs are two commonly used types of handoffs. A soft handoff is one where a new communication link with a new base station is established before the existing communication link is terminated. In a hard handoff, an existing communication link is typically terminated before a new communication link is established.

Some mobile communication devices may utilize a directional or adaptive antenna. Directional and/or adaptive antennas are typically used to direct signal transmissions in a desired direction. These types of antennas have many advantages over omni-directional antennas when used in modern communications systems. These advantages occur for both transmission and reception of information-bearing signals. During transmission, the directional concentration of radiated energy beam towards a receiver significantly increases the amount of received power per unit of transmitted power. This generally improves the throughput rate of the transmitter-to-receiver link and allows higher rates of information transfer. Furthermore, in interference-limited systems the concentration of power towards the intended receiver reduces the interference caused by the transmitter to the rest of the system, hence increasing its overall capacity. However, performing an efficient handoff using an adaptive or directional antenna has several challenges since directional beams make it difficult to switch between receivers (e.g., base stations) while maintaining a reliable link at the same time.

SUMMARY

A communication device is provided having a first antenna configured to operate as a directional antenna and a control circuit communicatively coupled to the first antenna. The control circuit is configured to (a) establish a first communication link with a first base station via the first antenna, (b) search for a second base station, and (c) determine if a communication handoff should be performed from the first base station to the second base station. The control circuit is also configured to (a) initiate a communications handoff from the first base station to the second base station, (b) transmit information over the first antenna to the first base station, and (c) receive information over the first antenna from the first base station. Additionally, the control circuit establishes a second communication link with the second base station and terminates the first communication link with the first base station. The control circuit may search for the second base station by periodically, continuously, or sporadically scanning for pilot signals from base stations and stores the directional and signal strength information of the base stations found during the search. Searching for the second base station may include configuring the first antenna to generate a plurality of directional search beams, and scan each directional search beam for pilot signals from base stations. The plurality of directional search beams may be scanned one beam at a time to obtain the relative direction of the base stations and/or span all directions of the first antenna to obtain the relative direction of the base stations. The plurality of directional search beams may corresponds to predefined discrete sectors of the first antenna. According to one implementation, searching for the second base station includes obtaining known locations of one or more base stations and configuring the first antenna to search for at least one of the one or more base stations based on the known locations.

In one implementation, a second antenna is communicatively coupled to the control circuit and configured to search for the second base station. During a communications handoff, a second communication link is established with the second base station via the second antenna. If a signal is received indicating that the second base station is ready to communicate over the second communication link, the control circuit is further configured to switch the second communication link to a directional beam on the first antenna directed to the second base station.

Determining whether a communication handoff should be performed from the first base station to the second base station may include determining the signal strength of the first base station, determining the signal strength of the second base station, and initiating the communications handoff from the first base station to the second base station if the signal strength of the second base station is greater than the signal strength of the first base station. In one example, the communications handoff from the first base station to the second base station is initiated if the signal strength of the first base station is below a threshold value. The communication device may simultaneously transmit to both the first base station and the second base station using different directional beams. The control circuit may be configured to reconfigure the first antenna to operate as an omni-directional antenna during the communications handoff, and reconfigure the first antenna to operate as a directional antenna once a second communication link is established with the second base station. In one implementation, the first base station and second base stations are part of an aeronautical communications network.

A hard handoff may be initiated from the first base station to the second base station which includes terminating the first communication link with the first base station, and then establishing a second communication link with the second base station. Establishing the second communication link may include setting up a physical layer call between the communication device and the second base station.

Another implementation provides a wireless communication device comprising first means for adaptive wireless communications and control means coupled to the first means for adaptive wireless communications. The control means may be configured to establish a first communication link with a first base station, search for a new base station, and determine if a communication handoff should be performed from the first base station to a second base station. If a communication handoff is warranted, then the control means initiates a communication handoff from the first base station to the second base station, establishes a second communication link with the second base station, and, if a signal is received indicating that the second base station is ready to communicate over the second communication link, transmits over the second communication link and terminates the first communication link. The wireless communication device may also include a second means for wireless communications communicatively coupled to the control means, wherein the second means for wireless communications is employed to search for the new base station. The wireless communication device may be further configured to reconfigure the first means for adaptive wireless communications to operate as an omni-directional antenna during the communication handoff and reconfigure the first means for adaptive wireless communications to operate as a directional antenna once a second communication link is established with the second base station.

Another feature provides a method for switching communications between base stations using an adaptive antenna, including the steps of (a) establishing a first communication link with a current base station over the adaptive antenna, (b) searching for a new base station, (c) determining if a communication handoff should be performed from the current base station to the new base station, (d) initiating a communications handoff from the current base station to the new base station, (e) establishing a second communication link with the new base station, and (f) maintaining the first communication link with the current base station until the new base station is ready to communicate over the second communication link. The method for switching communications between base stations may further include transmitting over the second communication link through the adaptive antenna and terminating the first communication link once the new base stations begins receiving on the second communication link. The first communication link and second communication link may both be performed by the adaptive antenna. Additionally, the adaptive antenna may be configured to generate a plurality of directional search beams and periodically, continuously, or sporadically scanning each directional search beam for pilot signals from base stations, wherein the search beams are scanned one beam at a time to obtain the relative direction of base stations detected. In another implementation, the first communication link may be established via a first directional beam of the adaptive antenna and the second communication may be established via a second directional beam of a second antenna. Moreover, the adaptive antenna may be reconfigured to operate as an omni-directional antenna during the communications handoff, and reconfigured to operate as a directional antenna once a second communication link is established with the second base station. Known locations of one or more base stations may be obtained and used to configure the adaptive antenna to search for at least one of the one or more base stations.

Another implementation of the invention provides a machine-readable medium comprising instructions executable by a processor for performing a communications handoff between base stations using an adaptive antenna, which when executed by a processor, causes the processor to perform operations comprising (a) establishing a first communication link with a current base station, (b) configuring the adaptive antenna to generate a plurality of directional search beams to search for a new base station, (c) periodically, continuously, or sporadically scanning each directional search beam for pilot signals from base stations, wherein the search beams are scanned one beam at a time to obtain the relative direction of the base stations detected, (d) and determining if a communication handoff should be performed from the current base station to the new base station. If a communication handoff is to be performed, the processor performs the operations comprising (a) simultaneously transmitting to both the current base station and the new base station using different directional beams, (b) establishing a second communication link with the new base station, and (c) maintaining the first communication link with the current base station until the new base station is ready to communicate over the second communication link. Determining if a communication handoff should be performed may include the steps of (a) determining a signal strength of a detected new base station, (b) comparing the signal strength of the new base station to a signal strength for the current base station, and (c) initiating the communication handoff from the current base station to the new base station if the signal strength of the new base station is greater than the signal strength of the current base station. In one example, the communication handoff is a hard handoff where a second communication link with the new base station is established after terminating the first communication link with the current base station. Establishing the second communication link may include setting up a physical layer call between the communication device and the new base station.

Another implementation of the invention provides a communication system comprising (a) a plurality of networked base stations including a first base station and a second base station, and (b) a mobile communication transceiver including an adaptive antenna to wirelessly couple the communication transceiver to a base station, a control circuit communicatively coupled to the adaptive antenna. The control circuit may be configured to (a) establish a first communication link with the first base station, (b) configure the adaptive antenna to generate a plurality of directional search beams to search for new base stations, and (c) periodically, continuously, or sporadically scan each directional search beam for pilot signals from other base stations, wherein the search beams are scanned one beam at a time to obtain the relative direction of base stations detected. Additionally, the communication system may be further configured to (a) determine whether a communication handoff from the first base station to the second base station is warranted, and (b) if such communication handoff is warranted, then simultaneously transmit to the first base station and the second base station. The communication system then establishes a second communication link with the second base station and terminates the first communication link with the first base station when the second base station is ready to communicate over the second communication link.

In one implementation, the communication system includes a base station controller communicatively coupled to the first and second base stations and configured to facilitate transferring a communication link from the first base station to the second base station. The base station controller may be configured to transmit a signal to the mobile communication transceiver via the first communication link indicating that the second base station is ready to communicate over the second communication link.

The mobile communication transceiver may determine whether a communication handoff from the first base station to the second base station is warranted, and if such communication handoff is warranted, then performs a hard handoff by pointing the adaptive antenna to the second base station, and establishing a second communication link with the second base station by setting up a physical layer call between the mobile communication transceiver and the second base station. The mobile communication transceiver may terminate the first communication link with the first base station before establishing the second communication link with the second base station.

In one example, the communication system includes a base station controller communicatively coupled to the first and second base stations and, wherein the base station controller is configured to recognize when the mobile communication transceiver has switched from the first base station to the second base station and route unacknowledged packets addressed to the mobile communication transceiver to the to the second base station. The base station controller may recognize when the mobile communication transceiver has switched from the first base station to the second base station by monitoring for unacknowledged packets addressed to the mobile communication transceiver to the to the first base station.

Yet another implementation of the invention provides a processor comprising (a) an input interface to communicate with an adaptive antenna and (b) a circuit. The circuit being configured to (a) establish a first communication link with a current base station, (b) direct the adaptive antenna to generate a plurality of directional search beams to search for a new base station, (c) periodically, continuously, or sporadically scan each directional search beam for pilot signals from base stations, wherein the search beams are scanned one beam at a time to obtain the relative direction of the base stations detected, and (d) determine if a communication handoff should be performed from the current base station to the new base station. Additionally, the circuit may also be configured to (a) simultaneously transmit to both the current base station and the new base station using different directional beams, (b) establish a second communication link with the new base station, and (c) maintain the first communication link with the current base station until the new base station is ready to communicate over the second communication link.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One feature of the invention provides a way of determining whether a communication device should initiate a communications handoff from a first base station to a second base station. Generally, the communication device uses a directional antenna to communicate with its current base station and periodically, continuously, or sporadically scans for better base stations using a plurality of directional beams. The directional beams are scanned one beam at a time to obtain the relative direction and/or signal strength of the base stations detected.

Another feature of the invention provides a system and method for performing a communication handoff between different base stations utilizing a directional antenna. For example, communications from a communication device to a first base station are efficiently switched to a second base station, with minimal or no interruptions, where the communication device uses one or more directional antennas. Generally, two directional transceivers may be configured to generate two directional beams, one for the first base station and one for the second base station. Alternatively, an adaptive antenna is configured to operate as an omni-directional antenna during the handoff process and switched back to a directional antenna, with a directional beam, once a communication link is established with the new base station.

Figure 1:
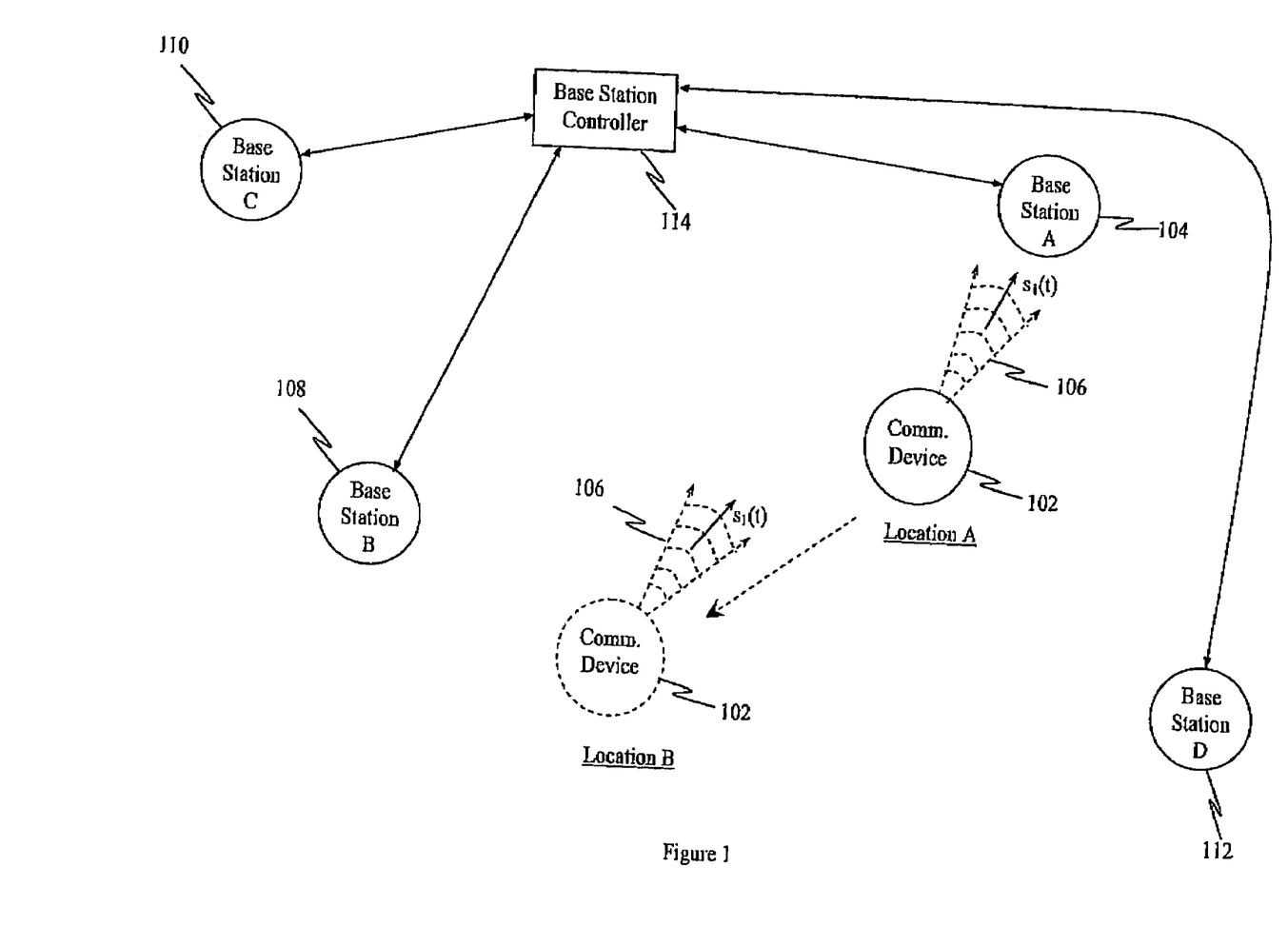
FIG. 1 illustrates a wireless communication system having a communication device that performs a base station search and handoff according to one implementation of the present invention.

FIG. 1 illustrates a wireless communication system having a communication device 102 that performs a base station search and handoff according to one implementation of the present invention. In one implementation of the invention, communication device 102 may be a transceiver having an adaptive or directional antenna. Wireless communication device 102 may include a processing unit or control circuit to manage communication functions and/or configure the directional antenna (via weight vectors, for instance) to form the desired directional beam(s). A storage device or memory device may be coupled to the processing unit or control unit to store antenna settings, base station location information, etc. In some embodiments of the invention, the adaptive or directional antenna may be configured to form one or more continuous or discrete directional beams and/or operate as an omni-directional antenna. According to various implementations of the invention, wireless communication device 102 may be a consumer device (e.g., cell phone, personal assistant, or computer) and/or a network device (e.g., wired/wireless gateway, relay, and/or modem).

Wireless communication device 102 may communicate with a first base station 104, which may be part of a wireless network. For example, a plurality of base stations 104, 108, 110, and 112 may be part of an aeronautical communications network that enable communication device 102, which may be mounted on an aircraft, to receive and/or transmit information to other devices beyond the aircraft. A base station controller (BSC) 114 may be communicatively coupled to the plurality of base stations to manage communication setup and forwarding among the base stations.

Communication device 102 may include an adaptive or directional antenna that permits it to focus its transmitted beam 106 toward the first base station 104. The use of an adaptive or directional antenna has the advantage of focusing the beam(s) 106 to a desired receiver (e.g., base station 104), reducing the amount of power needed for transmission of a signal $s_1(t)$, and reducing unwanted interference to other devices.

As communication device 102 moves from a first location (e.g., Location A) to a second location (e.g., Location B), it may move farther away from the first base station 104 and closer to other base stations (e.g., base station 108). This may occur, for example, when the aircraft on which the communication device is mounted is in flight. As its distance from first base station 104 increases, the communication link between communication device 102 and first base station 104 may degrade. Various features of the present invention provide efficient ways of switching or handing off communications to a second base station with minimal or no interruptions in service.

As communication device 102 moves around in the coverage area of the wireless network (e.g., base stations 104, 108, 110, and 112), it may come within range of other base stations which may provide a better communication link than its existing link with first base station 104. Therefore, communication device 102 may have a mechanism to periodically, continuously, or sporadically monitor if a better base station exists than its current base station (i.e., base station 104). Besides using signal strength related metrics, the communication device 102 may also use position location of itself and/or the base stations 104, 108, 110, and 112 to determine if a handoff is warranted and/or to which base station the handoff should occur.

Figure 2:
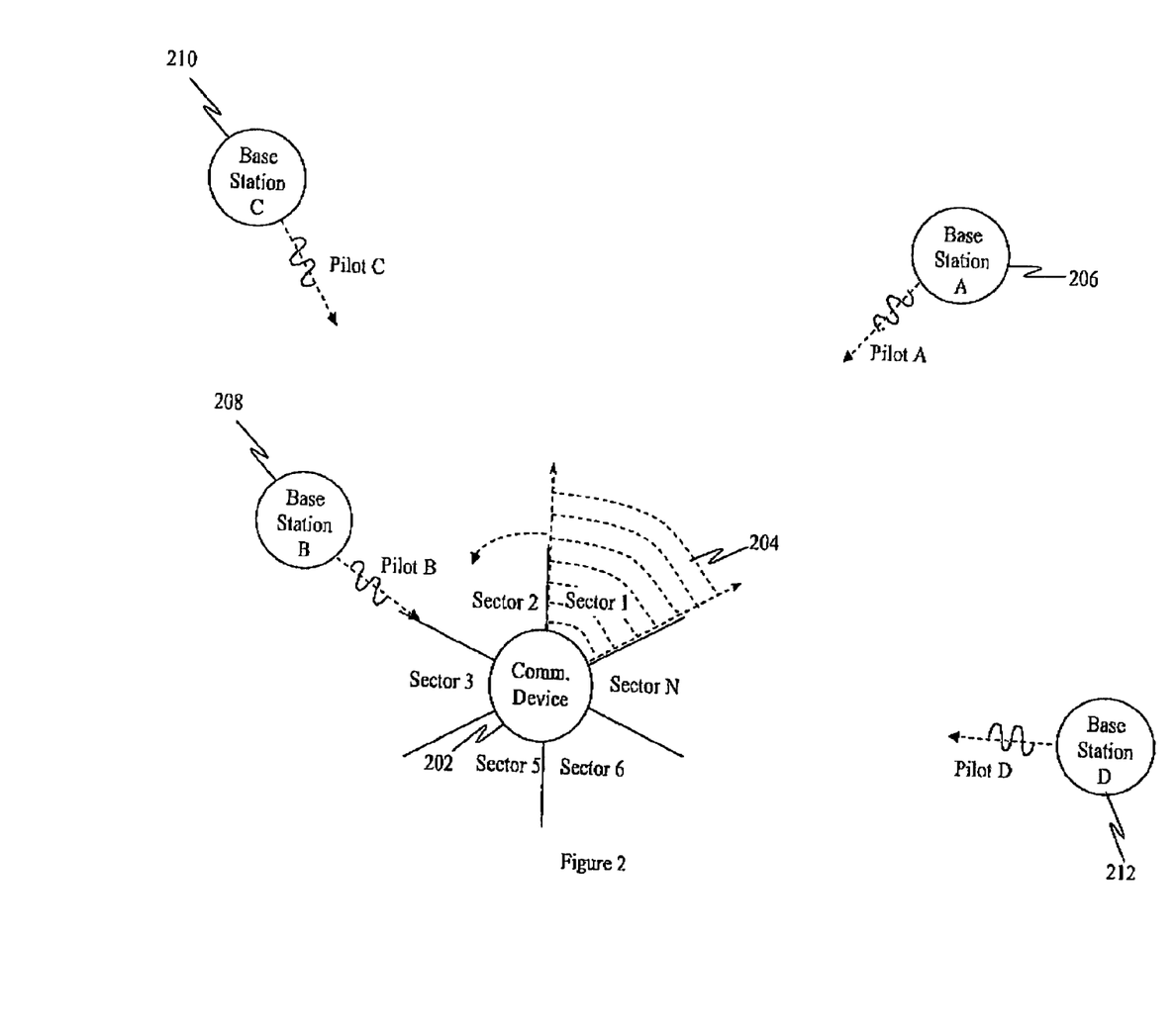
FIG. 2 illustrates a wireless communication system having a communication device that communicates with a current base station while searching for a better base station according to one implementation of the present invention.

FIG. 2 illustrates a wireless communication system having a communication device 202 that communicates with a current base station 206 while searching for a better base station according to one implementation of the present invention. In order for communication device 202 to expeditiously determine whether a better base station is available, communication device 202 may periodically, continuously, or sporadically search for all base stations available in every direction or sectors relative to communication device 202. This may be done in a number of ways.

In the most general case, the communication device 202 may form a receiving directional beam 204 of a given beamwidth in any direction in azimuth and elevation. Initially, communication device 202 forms directional beams 204 covering all sectors (e.g., Sectors 1-N) and chooses the sector/beam from which it receives the highest Signal to Interference plus Noise (SINR) ratio with which to communicate. Beams 204 may be formed by configuring the directional antenna to create beams 204 in any desired direction. Directional beams 204 (in Sectors 1-N) are scanned one beam at a time to obtain the relative direction and/or signal strength of the base stations detected. That is, the transceiver's operation is divided into timeslots to search for better base stations and to transmit and/or receive with its current base station.

In practice, the communication device's directional antenna may not be able to form beams in any direction but rather in a few discrete directions. Therefore, the best base station to select may be defined from the best beam position or sector that provides the highest SINR. For example, communication device 202 may utilize a directional antenna having N fixed beam positions, where N is an integer greater than one. Communication device 202 may scan through each of the N fixed positions to determine whether other base stations are within communication distance.

As part of the wireless network communication system, base stations 206, 208, 210, and 212 may periodically broadcast a beacon or pilot signal (e.g., Pilot A, Pilot B, Pilot C, and Pilot D) to notify others of their presence. Communication device 202 may keep track of which base stations it finds at each beam position or sector. The pilot signals may also be used to determine the signal strength or SINR at each sector scanned by communication device 202. The SINR is measured across all sectors or beam positions and the sectors or beam positions are ranked based on the SINR values. If there is a new sector or beam whose SINR is better (e.g., higher) or within a threshold of the currently used beam (e.g., beam to base station 104), then a handoff to a new base station is initiated.

A handoff may also be initiated if a better base station is identified in the same sector or beam being used to communicate with the current base station. For example, if a pilot signal belonging to a new base station is identified on the same beam as the currently used base station, then the beam or sector used remains the same and signaling is used to change base stations. Two base stations or pilot signals on a single beam may be distinguished based on their different frequencies, base station ID, pilot signal signature, or signaling with the base station controller.

There are several different ways in which communication device 202 may search for a better base station. In one approach, communication device 202 schedules certain time periods to carry out the search during which time it does not receive data from the network (e.g., from current base station 206). During this time, communication device 202 switches through all possible receiving beam positions in its antenna or sectors (e.g., Sectors 1-N) and measures SINR from all base station pilot beams (e.g. Pilot A, Pilot B, Pilot C, and Pilot D) visible to the antenna beams. The disadvantage of this approach is that, during the search time periods, communication device 202 stops receiving from and/or transmitting to the current base station (e.g. base station 206) causing a delay in communications that may result in loss of data for delay-sensitive applications. However, if the search is completed quickly enough (e.g., a few seconds or less) or the applications (e.g., systems using communication device 202 to communicate to the network and beyond) can tolerate some delay, then this approach is quite feasible.

Another approach to searching for better base stations is for communication device 202 to use two receivers, where one receiver is used to periodically, continuously or sporadically search for new base stations and the other receiver is used to maintain communications with current base station 206.

An alternative to communication device 202 searching for new base stations is to use its knowledge of its current location (e.g., geographical position of the aircraft) of communication device 202 and/or the known locations of the base stations in the network to determine the antenna sector or beam through which to communicate. For instance, communication device 202 may have or receive information about its current location as well as neighboring base stations and uses this information to create a directional beam toward a selected base station.

Once a new sector or directional beam has been determined to provide better performance than the currently used sector or beam to current base station 206, communication device 202 initiates a handoff to new station 208 associated with the new sector or antenna beam. Where a new base station is found on the same sector or receiving beam as the current base station, then the handoff may be done within the same sector or beam.

Once a better base station has been identified, the difficulty is in achieving a handoff to the new base station using a directional antenna. During the handoff, the communication link with the current base station is maintained to provide uninterrupted service while the new communication link with the new base station is established. Both the current and new base stations should receive signals from the communication device during the handoff process. This is quite challenging to do using a directional antenna. In various implementations, the handoff may be carried out with either one or two transceivers.

Figure 3:
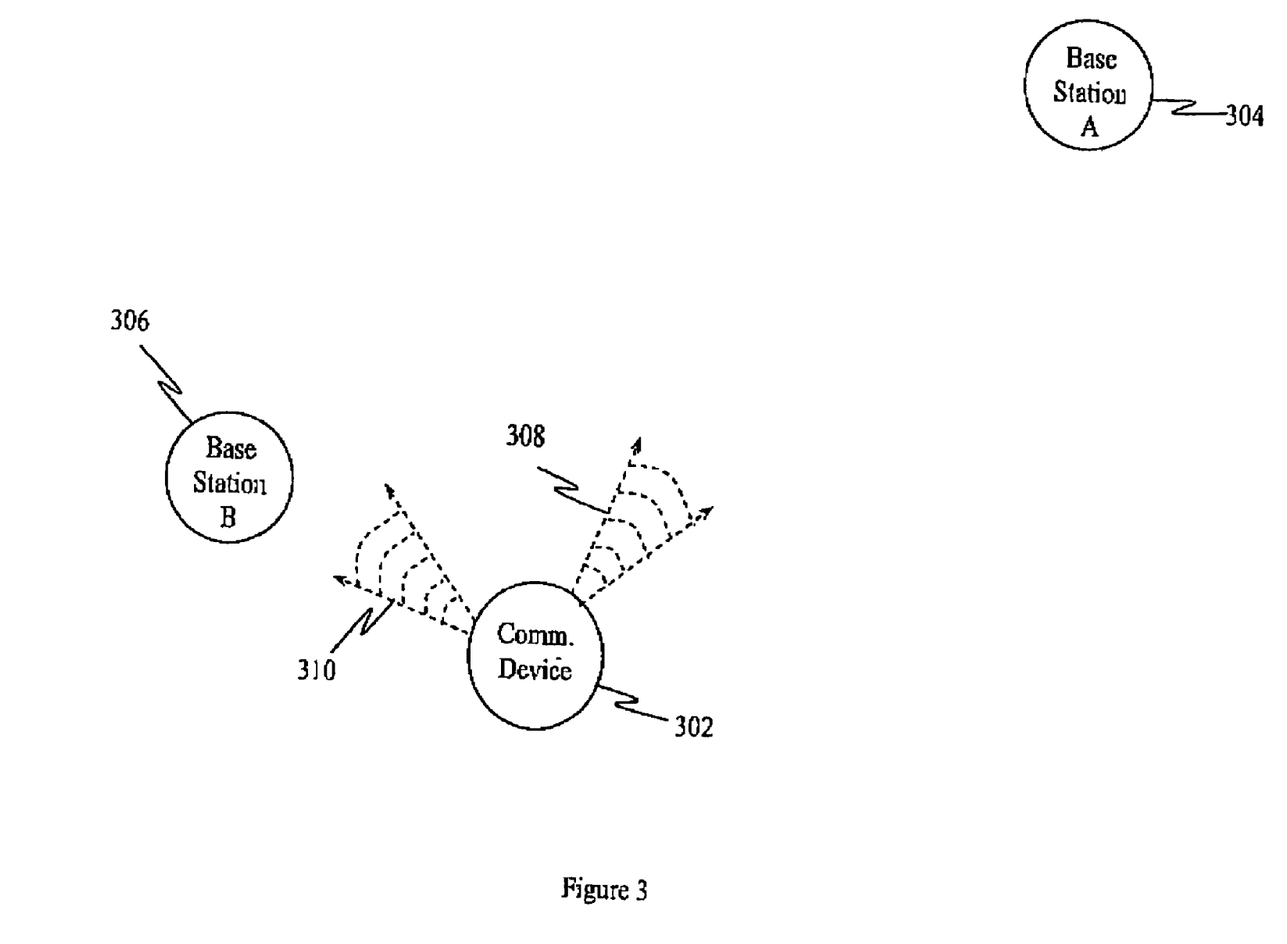
FIG. 3 illustrates a communication device having two directional beams to achieve a communication handoff according to one implementation of the invention.

FIG. 3 illustrates a communication device 302 having two directional beams to achieve a communication handoff according to one implementation of the invention. In order to maintain a smooth transition between a currently used base station 304 and a new base station 306 this approach uses two transceivers (corresponding to beams 308 and 310, respectively). In this approach, communication device 302 initiates handoff to new base station 306 using a second transceiver 310 while it continues transmitting and receiving from the current base station 304 using a first transceiver 308. Communication device 302 points one beam 310 toward the sector to which it wants to handoff, and another beam 308 toward the current sector with which it has been communicating. This allows new base station 306 to acquire the signal from communication device 302 while communication device 302 continues transmitting and receiving data with its current base station 304. Once communication device 302 has been informed that the new base station 306 has successfully acquired the signal from communication device 302, the communication device 302 switches communications from current base station 304 to new base station 306 and stops transmitting to the old sector (e.g., towards base station 304). For example, a first transceiver is used to form beam 308 to current base station 304 while a second transceiver may be used to form beam 310 to new base station 306. Once communications are established with the new base station 306 using the second transceiver, the first transceiver may be used to search for new beams. Thus, the purpose of the first and second transceivers may alternate the search and communication functions. In another implementation of the invention, once communications are established with new base station 306, new beam 310 may be transferred or switched to the first transceiver, thereby freeing the second transceiver for future searching of new base stations.

In another approach, communication device 302 may use just one transceiver to perform the communication handoff from a current base station to a new base station. In this implementation, there are at least two different methods of carrying out the handoff.

Figure 4:
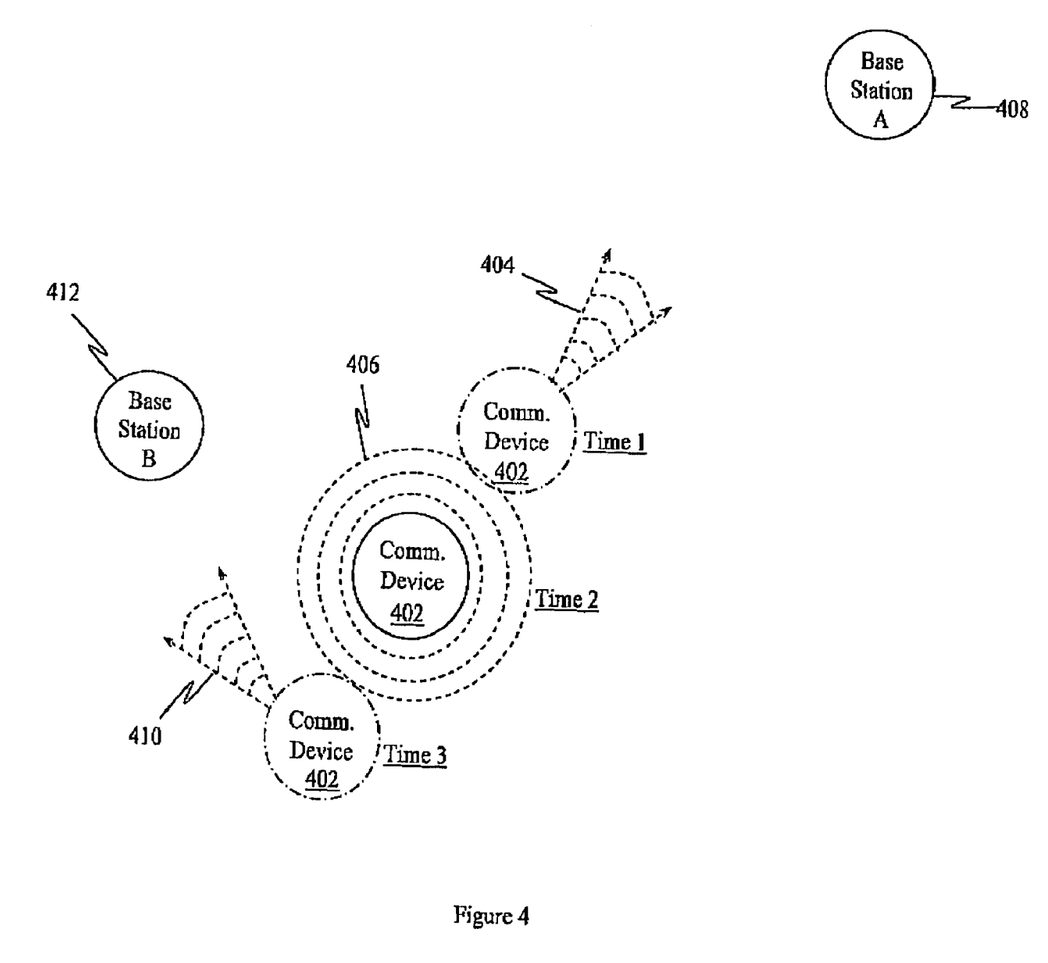
FIG. 4 illustrates one method of implementing a communication handoff between base stations according to one implementation of the present invention.

FIG. 4 illustrates one method of implementing a communication handoff between base stations according to one implementation of the present invention. A communication device 402 switches its directional antenna beam 404 to an omni-directional or a wide beamwidth antenna beam 406 and starts the handoff process. This may be accomplished by using an adaptive antenna that can be configured to operate as either a directional antenna or omni-directional antenna or using two separate antennas, e.g., one directional antenna and one omni-directional antenna. In this scheme, since the omni-directional or wide beamwidth antenna on communication device 402 has lower gain and receives more interference than the directional antenna, the communication device's data rate is likely lower. Therefore, once the communication device 402 starts the handoff process it may lower its data rate on both the forward link (transmission from communication device 402) and reverse link (reception at communication device 402) in order to avoid increasing the frame error rate.

Once the communication device 402 receives notification from its current base station 408 that the handoff has been completed (e.g., the new base station 412 has acquired the signal from the communication device 402), it may then switch to a directional antenna beam 410 which points a narrow beam toward new base station 412 to which the handoff was completed. Narrower beam 410 increases the antenna gain and reduces interference received from other sectors in the system to support higher rates.

Figure 5:
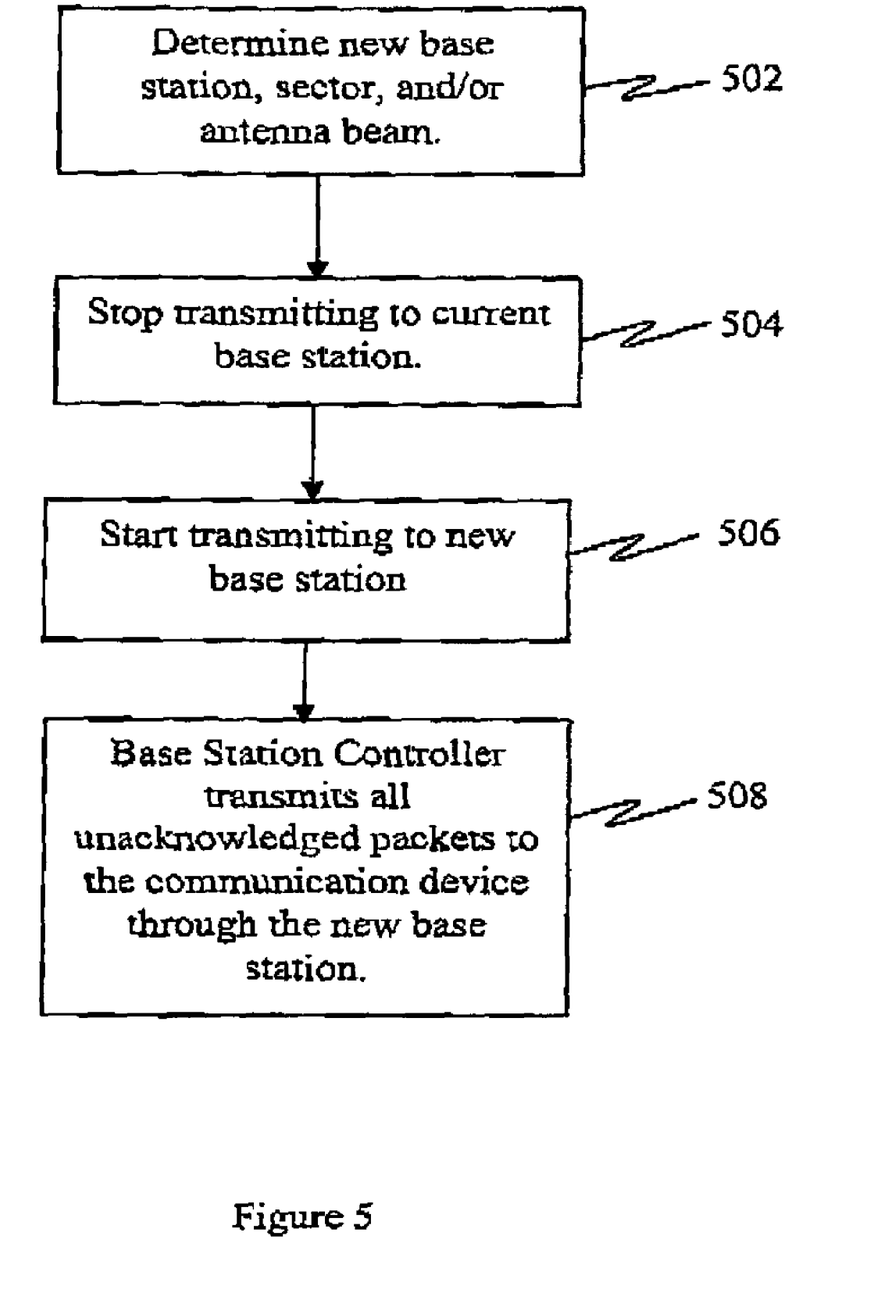
FIG. 5 is a flow diagram illustrating another approach to a single transceiver communication handoff between base stations according to one implementation of the present invention.

FIG. 5 is a flow diagram illustrating another approach to a single transceiver communication handoff between base stations according to one implementation of the present invention. In general, this handoff method uses a hard handoff and the communication system's upper layer error recovery mechanisms. Once the communication device has determined the best new base station and the best sector or beam on which to communicate 502, it may stop transmitting on the current beam to the current base station 504. The communication device then starts transmitting using the new antenna beam to the new base station or sector 506 by basically setting up a physical layer connection to the new sector. This may be done by going through the usual physical layer call set up procedures.

Once the communication device sets up the physical layer connection to the new base station, the Base Station Controller (BSC) entity (see 114 in FIG. 1), which controls the base stations for functions such as handoffs and also interfaces to the wireline core network, may transmit all unacknowledged packets to the communication device through the new base station 508. The BSC generally maintains the state of the packets that have been correctly received and acknowledged by the communication device. The BSC recognizes that a communication device, having a unique identifier, is the same communication device that stopped transmitting on a different sector or beam. The BSC starts routing the unacknowledged packets to the new base station. In other words, when a communication device that already had a connection to the BSC via a current base station tries to set up a new connection to the BSC through a new base station, the BSC switches communications to the communication device to the new base station while stopping transmission to the current base station. In this scheme the physical layer is established anew but the handoff is in effect carried out at the upper layer through the BSC.

Figure 6:
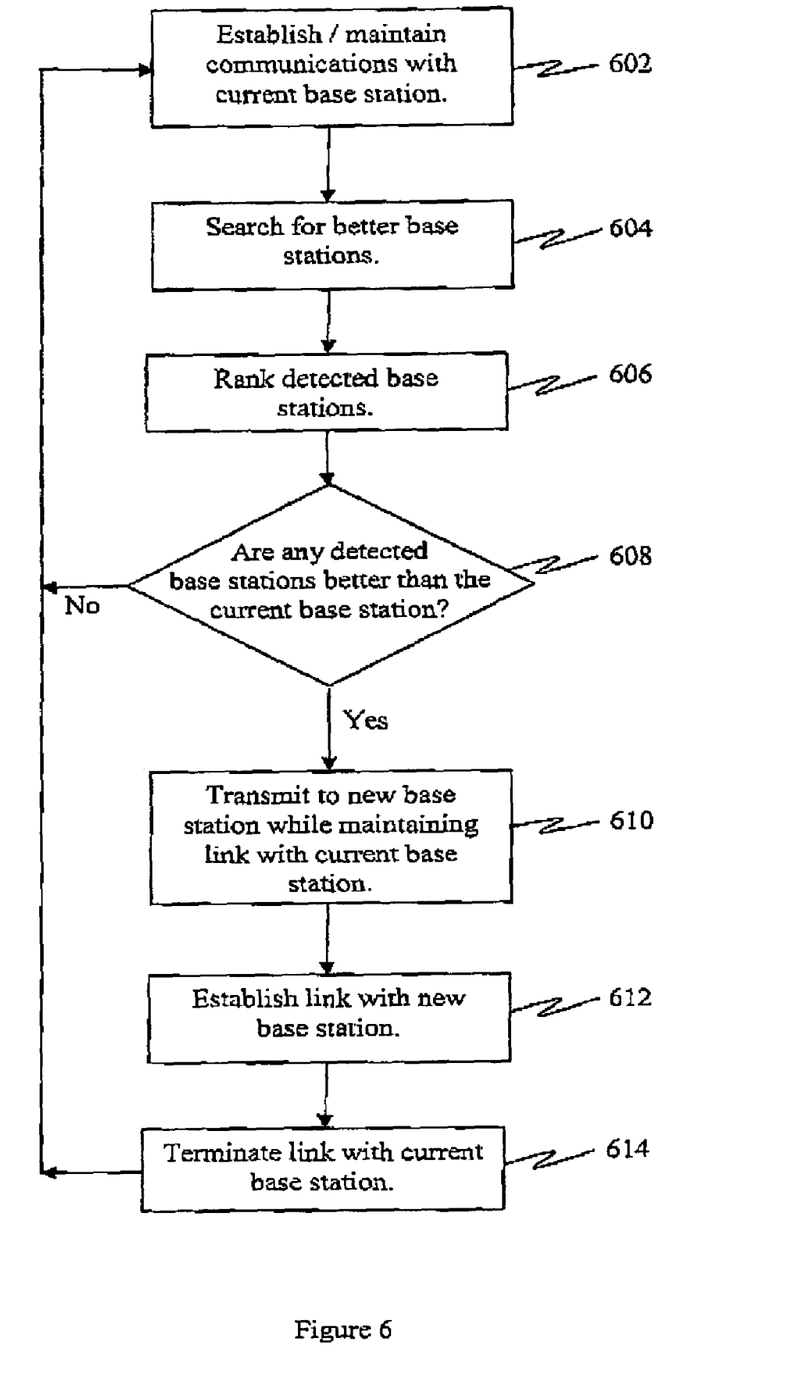
FIG. 6 illustrates a method of performing base station searching and handoff according to one implementation of the invention.

FIG. 6 illustrates a method of performing base station searching and handoff according to one implementation of the invention. This method outlines the steps performed during the base station searching and handoff processes that have been described in more detail above. A first communication link is established and maintained between the communication device and a current base station 602. Since the communication device moves, it may come within range of other base stations. The communication device periodically, continuously, or sporadically searches for better base stations 604. The detected base stations are then ranked according to their signal strength 606. If any of the detected base stations are better (e.g., has a greater signal strength) than the current base station 608, then a communication handoff is initiated. Otherwise, the communication device continues to transmit and/or receive over the communication device and search for better base stations. If the communication handoff is initiated, a new base station, one having the greatest signal strength, is selected from the detected base stations. The communication device transmits its signals to both the current base station and the new base station 610. These transmissions to two base stations may be performed in any of the ways previously described. This enables the new base station to identify the signal and setup a link with the communication device while the current base station continues to provide a communication link. Once the communication link is established with the new base station 612, the link and transmissions to the current base station is terminated. The communication device then repeats the process of transmitting and receiving over a base station while searching for a better base station.

Figure 7:
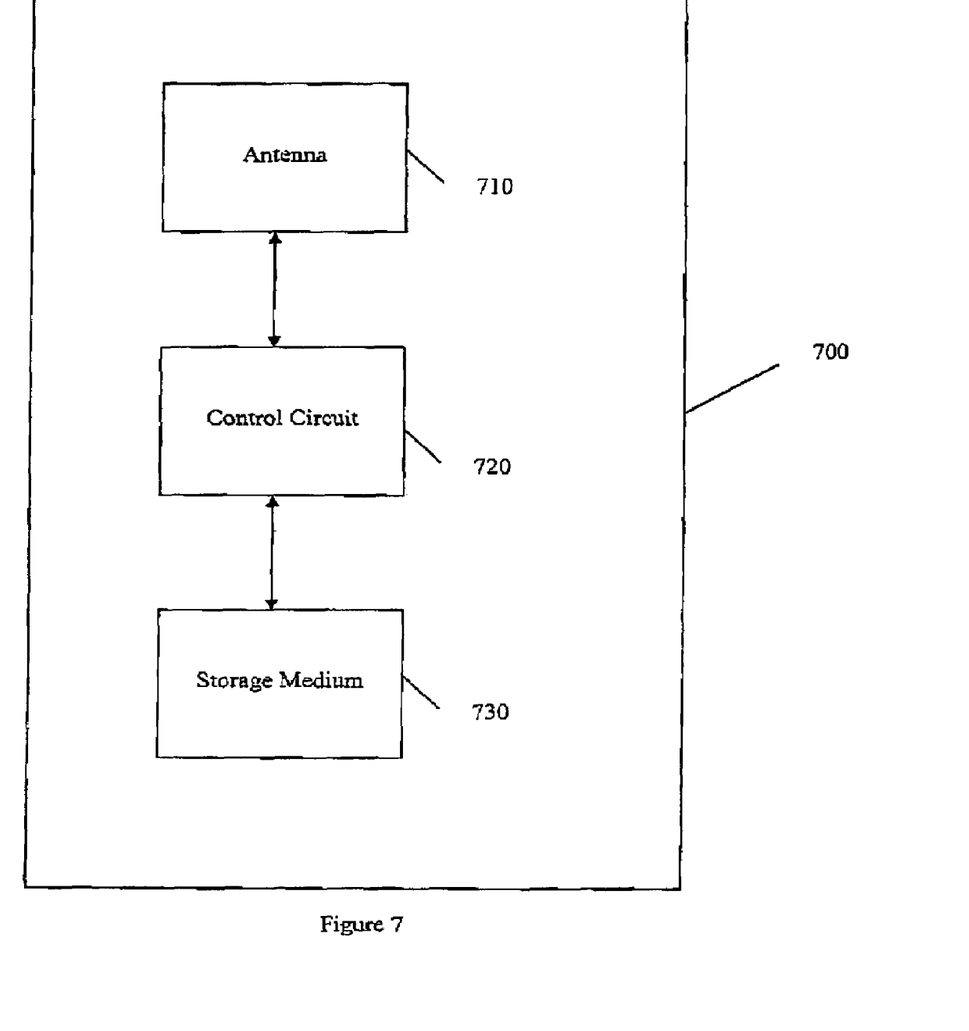
FIG. 7 shows an example device 700 that may be implemented as a communication device.

FIG. 7 shows an example device 700 may comprise an antenna 710 and a control circuit 720, configured to perform communication handoff from a first base station to a second base station as described above. The processing circuit 720 may comprise of an input interface and circuits used in performing the communication handoff. Device 700 may also comprise a storage medium 730 that may comprise instructions executable by processing circuit 820 for performing a communications handoff between bases stations using antenna 710.

The various features of the invention described herein can be implemented in different systems without departing from the invention. For example, some implementations of the invention may be performed with a moving or static communication device and a plurality of mobile or static base stations. For example, the base stations may be satellites and the communication device may be on either a moving vehicle or a static location.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A communication device comprising:
    a first antenna configured to operate as a directional antenna;
    a control circuit communicatively coupled to the first antenna, the control circuit configured to
    establish a first communication link with a first base station via the first antenna, search for a second base station,
    determine if a communication handoff should be performed from the first base station to the second base station, and
    initiate a communications handoff from the first base station to the second base station and
    a second antenna communicatively coupled to the control circuit and configured to search for the second base station, wherein during the communications handoff, a second communication link is established with the second base station via the second antenna and wherein, if a signal is received indicating that the second base station is ready to communicate over the second communication link, the control circuit is further configured to switch the second communication link to a directional beam on the first antenna directed to the second base station.

2. The communication device of claim 1 wherein the control circuit is further configured to establish a second communication link with the second base station, and terminate the first communication link with the first base station.

3. The communication device of claim 1 wherein searching for the second base station
   includes periodically, continuously, or sporadically scanning for pilot signals from base stations, and
   storing the directional and signal strength information of the base stations found during the search.

4. The communication device of claim 1 wherein searching for the second base station includes configuring the first antenna to
   generate a plurality of directional search beams, and
   scan each directional search beam for pilot signals from base stations.

5. The communication device of claim 4 wherein the plurality of directional search beams corresponds to predefined discrete sectors of the first antenna and the search beams are scanned one beam at a time to obtain the relative direction of the base stations.

6. The communication device of claim 1 wherein searching for the second base station includes
   obtaining known locations of one or more base stations, and
   configuring the first antenna to search for at least one of the one or more base stations based on the known locations.

7. The communication device of claim 1 wherein determining if a communication handoff should be performed from the first base station to the second base station includes determining the signal strength of the first base station,
   determining the signal strength of the second base station, and
   initiating the communications handoff from the first base station to the second base station if the signal strength of the second base station is greater than the signal strength of the first base station.

8. The communication device of claim 7 wherein the communications handoff from the first base station to the second base station is initiated if the signal strength of the first base station is below a threshold value.

9. The communication device of claim 1 further comprising:
   simultaneously transmitting to both the first base station and the second base station using different directional beams.

10. The communication device of claim 1 wherein the control circuit is further configured to
    reconfigure the first antenna to operate as an omni-directional antenna during the communications handoff, and
    reconfigure the first antenna to operate as a directional antenna once a second communication link is established with the second base station.

11. The communication device of claim 1 wherein the first base station and second base stations are part of an aeronautical communications network.

12. The communication device of claim 1 wherein initiating the communications handoff from the first base station to the second base station is a hard handoff that includes
    first terminating the first communication link with the first base station, and
    secondly establishing a second communication link with the second base station.

13. The communication device of claim 12 wherein establishing the second communication link includes setting up a physical layer call between the communication device and the second base station.

14. A wireless communication device comprising:
    first means for adaptive wireless communications; and
    control means coupled to the first means for adaptive wireless communications, the control means configured to
    establish a first communication link with a first base station,
    search for a new base station,
    determine if a communication handoff should be performed from the first base station to a second base station,
    initiate a communication handoff from the first base station to the second base station,
    establish a second communication link with the second base station, and
    wherein, if a signal is received indicating that the second base station is ready to communicate over the second communication link, the control means transmits over the second communication link, and
    terminates the first communication link and
    second means for wireless communications communicatively coupled to the control means, wherein the second means for wireless communications is employed to search for the new base station,
    the first communication link is established via the first means for adaptive wireless communications and the second communication link is established via the second means for wireless communications, and
    the control means is further configured to switch the second communication link to the first means for adaptive wireless communications if the signal is received indicating that the second base station is ready to communicate over the second communication link.

15. A communication system comprising
    a plurality of networked base stations including
    a first base station, and
    a second base station; and
    a mobile communication transceiver including an adaptive antenna to wirelessly couple the communication transceiver to a base station, and
    a control circuit communicatively coupled to the adaptive antenna,
    wherein the control circuit is configured to
    establish a first communication link with the first base station, configure the adaptive antenna to generate a plurality of directional search beams to search for new base stations,
    periodically, continuously, or sporadically scan each directional search beam for pilot signals from base stations, wherein the search beams are scanned one beam at a time to obtain the relative direction of base stations detected
    wherein the control circuit is further configured to determine whether a communication handoff from the first base station to the second base station is warranted, and if such communication handoff is warranted, then
    simultaneously transmit to the first base station and the second base station, establish a second communication link with the second base station,
    terminate the first communication link with the first base station when the second base station is ready to communicate over the second communication link, and wherein simultaneously transmitting to the first base station and the second base station includes configuring the adaptive antenna to generate a first directional beam to communicate with the first base station,
configuring a second antenna to generate a second directional beam to communicate with the second base station, and
reconfiguring the adaptive antenna to operate as a directional antenna with a single directional beam to the second base station once the second communication link is established with the second base station.

16. The communication system of claim 15 further comprising:
A base station controller communicatively coupled to the first and second base stations and configured to transmit a signal to the mobile communication transceiver via the first communication link indicating that the second base station is read to communicate over the second communication link.

17. The communication system of claim 15 wherein the control circuit is further configured to
determine whether a communication handoff from the first base station to the second base station is warranted, and if such communication handoff is warranted, then performing a hard handoff by
pointing the adaptive antenna to the second base station, and
establishing a second communication link with the second base station by setting up a physical layer call between the mobile communication transceiver and the second base station.

18. The communication system of claim 17 wherein the control circuit is further configured to terminate the first communication link with the first base station before establishing the second communication link with the second base station.

19. The communication system of claim 17 further comprising:

a base station controller communicatively coupled to the first and second base stations and, wherein the base station controller is configured to
recognize when the mobile communication transceiver has switched from the first base station to the second base station, and
route unacknowledged packets addressed to the mobile communication transceiver to the to the second base station.

20. The communication system of claim 19 wherein the base station controller recognizes when the mobile communication transceiver has switched from the first base station to the second base station by monitoring for unacknowledged packets addressed to the mobile communication transceiver to the to the first base station.

* * * * *